(12) United States Patent  
Kumar et al.

(10) Patent No.: US 8,880,492 B2  
(45) Date of Patent: Nov. 4, 2014

(54) KEYWORD SUGGESTION FOR EFFICIENT LEGAL E-DISCOVERY

(75) Inventors: Shailesh Kumar, Hyderabad (IN); Mahesh Chhaparia, Hyderabad (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/219,846

(22) Filed: Aug. 29, 2011

(65) Prior Publication Data

US 2012/0310930 A1 Dec. 6, 2012

(30) Foreign Application Priority Data

May 30, 2011 (IN) .......................... 1829/CHE/2011

(51) Int. Cl.
 *G06F 17/30* (2006.01)
(52) U.S. Cl.
 CPC .... *G06F 17/30648* (2013.01); *G06F 17/30719* (2013.01)
 USPC ......................................... 707/706; 707/728
(58) Field of Classification Search
 USPC ................................................ 707/706, 728
 See application file for complete search history.

(56) References Cited

U.S. PATENT DOCUMENTS

| 7,062,485 | B1 * | 6/2006 | Jin et al. ................................. 1/1 |
| 7,725,465 | B2 * | 5/2010 | Liao et al. ...................... 707/728 |
| 7,752,190 | B2 * | 7/2010 | Skinner ......................... 707/706 |
| 7,761,423 | B1 * | 7/2010 | Cohen ........................... 707/637 |
| 7,801,875 | B2 * | 9/2010 | Kim ............................... 707/706 |
| 7,814,083 | B2 * | 10/2010 | Kwon et al. .................. 707/705 |
| 7,890,516 | B2 * | 2/2011 | Zarzar Charur et al. ...... 707/751 |
| 8,117,197 | B1 * | 2/2012 | Cramer ......................... 707/731 |
| 8,185,526 | B2 * | 5/2012 | Wen et al. ..................... 707/730 |

* cited by examiner

*Primary Examiner* — Kim Nguyen

(74) *Attorney, Agent, or Firm* — Sterne, Kessler, Goldstein & Fox P.L.L.C.

(57) ABSTRACT

Given a set of documents relevant to a litigation hold and a seed set of keywords, a second set of keywords can be generated and suggested to a user. Each document in a training set of documents is given an indication of relevance. Based on the indication of relevance, a set of further keywords relevant to the litigation is extracted from the documents and suggested to a user. The suggested set of keywords may or may not include keywords in the seed set. Additionally, the suggested set of keywords may be related to the seed set of keywords.

25 Claims, 5 Drawing Sheets

KEYWORD SUGGESTION FOR EFFICIENT LEGAL E-DISCOVERY

CROSS-REFERENCE TO RELATED APPLICATIONS

This application claims priority to Indian Provisional Application No. 1829/CHE/2011, filed May 30, 2011, which is incorporated by reference herein in its entirety.

BACKGROUND

1. Field

Embodiments relate to electronic discovery of documents subject to a litigation hold, and particularly to efficiently identifying a set of documents relevant to a litigation.

2. Related Art

During or in anticipation of a litigation, parties to a litigation may be required to preserve and eventually produce documents in their possession that relate to the litigation. Documents to be preserved are known as being subject to a litigation hold. Documents may exist in electronic form in computer systems or electronic storage devices. One element of electronic discovery (e-discovery) involves obtaining a thorough set of relevant documents from those computer systems and electronic storage devices. When there are a large number of documents contained in one or more computer systems, the e-discovery process can be very cumbersome. Compliance with a litigation hold requires a thorough search of the computer systems and electronic storage devices. However, at least for reasons of privacy and confidentiality, parties want to avoid producing documents that are not relevant to the litigation. Therefore, a final determination of a document's relevance to the litigation is usually made by a manual review process. The expense of this process is related to the number of documents reviewed.

To reduce the expense of e-discovery, computer software may be used to automatically search for and retrieve relevant documents. Typically, the software will search for emails or documents containing selected keywords or names of individuals related to the litigation. The names and keywords used in the search are identified by the parties or people associated with the case. However, the results of such searches may include many documents that are not relevant to the litigation or may exclude many documents that are relevant to the litigation.

BRIEF SUMMARY

Embodiments relate to systems and methods for suggesting criteria, such as keywords, to be used to identify documents for a litigation hold. In an embodiment, a seed set of keywords is received, a set of documents corresponding to the seed set of keywords is identified, and an indication of relevance for each document in the set of documents is received. A suggested set of keywords, which are determined to be discriminatory based on the indications of relevance, is generated. No keyword in the suggested set of keywords is contained in the seed set of keywords. The set of documents also corresponds to the suggested set of keywords. The suggested set of keywords is provided to a client.

In another embodiment, a seed set of keywords is received, a set of documents corresponding to the seed set of keywords is identified, and an indication of relevance for each document in the set of documents is received, and a suggested set of keywords is generated. No keyword in the suggested set of keywords is contained in the seed set of keywords. In this embodiment, each keyword in the suggested set of keywords is related to one or more keywords in the seed set of keywords. The suggested set of keywords is provided to a client.

In an embodiment, a seed set of keywords or queries is identified, and an indication of relevance for each document is received. A second set of keywords determined to be discriminatory is generated. Further, a set of keywords that are related to the second set of discriminatory keywords and/or the seed set of keywords may be generated. Discriminatory keywords and keywords related to the discriminatory or seed keywords may be fed into an algorithm, such as a Random Walk algorithm, to generate a suggested set of keywords to be provided to a client.

BRIEF DESCRIPTION OF THE DRAWINGS/FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
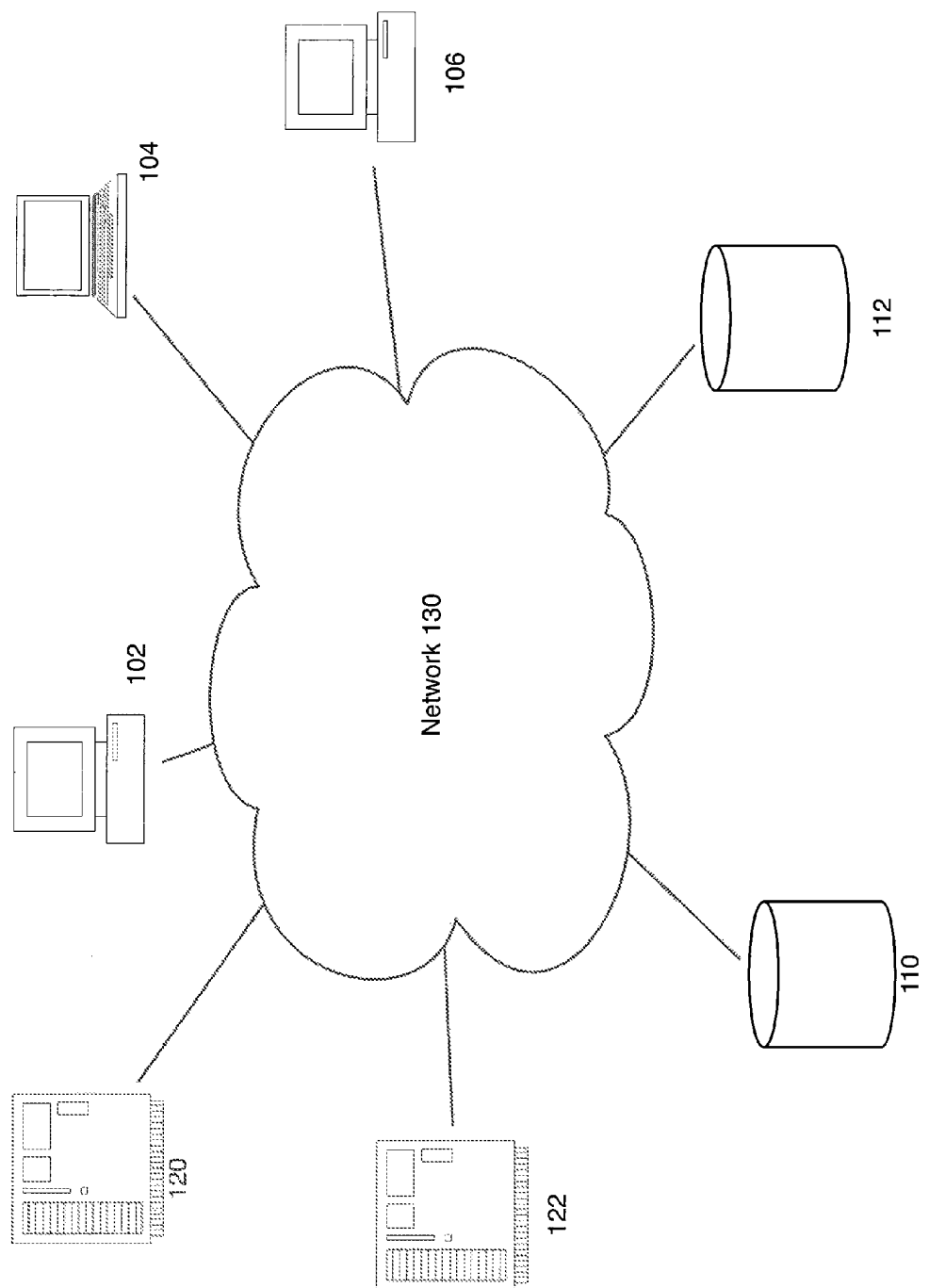
FIG. 1 is a diagram of an exemplary system that may be used in embodiments described herein.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Overview

Embodiments relate to systems and methods for performing electronic discovery of documents subject to a litigation hold, and particularly to efficiently identifying a set of relevant documents. A document may be any type of electronic file, including but not limited to an email, text message, distribution list, spreadsheet, text file, bit map, or graphics file. One of ordinary skill would recognize that other types of electronic files may also be electronic documents according to embodiments. Electronic documents, as referred to herein, may be accessible by known electronic communications methods and may be stored in a variety of storage media, including but not limited to electronic media, such as Random Access Memory (RAM) or Read Only Memory (ROM), magnetic media, such as tape drives, floppy disks or hard disk drives (HDD), and optical media, such as Compact Disks (CD) or Digital Video Disks (DVD).

To define the parameters and criteria of a litigation hold, a legal team may consider the facts of the case and the parties involved in the events leading up to the case. Based on the locations of these documents, a target corpus of documents to search may be identified. In some cases, it may be necessary to search through a large number of documents in a large storage area to find a few documents containing relevant information. The storage area to be searched may be identified by physical storage devices, logical storage partitions, document security designations, or by any other means known to one of ordinary skill in the art. A large search scope increases the potential for finding relevant documents but may require a prohibitively large search time and expense. The entire corpus of documents may be searched for documents that are relevant to the litigation, and a manual review of every document in the corpus could be a long and laborious process. Effectively filtering or culling the corpus may reduce the quantity of documents that need to be reviewed. Documents not meeting the search criteria may not be reviewed. In embodiments, the corpus of documents may be contained within a single computer or storage device, or the corpus of documents may be spread across multiple servers, client computers, storage devices and other components that may or may not be interconnected. For example, the corpus of documents may be stored in a hosted user environment utilizing distributed storage.

FIG. 1 is a diagram of a system 100 in which a corpus of documents may be contained, according to an embodiment. Although system 100 is described herein with respect to a limited number of devices and a single network, one of ordinary skill in the art will recognize that a system containing relevant documents may include different numbers of components and other types of components than those shown. In addition, the system components may be stand-alone or may be interconnected by one or more networks of various types.

System 100 of FIG. 1 is provided as a non-limiting example for explanation purposes. System 100 includes processing devices, such as servers 120 and 122, and client computers 102, 104 and 106. System 100 also includes storage devices 110 and 112. The devices in system 100 are interconnected by network 130. Network 130 may be a local area network (LAN), wide area network (WAN), intranet, internet, WI-FI, cell phone network, or any other wired or wireless network for communication between computing devices. One of ordinary skill in the art would recognize that there are many possible variations on the number and interconnection of computing and storage devices in which all or part of the corpus of documents could be contained and searched according to embodiments.

Utilizing one or more computing devices, the corpus of documents may be searched for potentially relevant documents. In system 100, a search may be initiated, for example, at client computer 102. The corpus of documents may be isolated to documents stored within client computer 102. Additionally or alternatively, the corpus may include documents contained within, e.g., storage device 110 and/or server 120. When a search is performed, information about each document or set of documents in the corpus of documents may be obtained. This information is compared to a set of search criteria that has been prepared in response to the litigation hold. The search criteria may include several types of information used to identify potentially relevant documents. For example, the names and locations of documents satisfying the search criteria may be returned in the search results. The actual documents may also be returned, or links may be provided to individual documents. Other sets of search results are possible.

Each potentially relevant document may be ranked according to how well it meets the search criteria. This ranking data may be performed by the search software and returned with the set of documents. Ranking data may be used to return a limited number of "top ranked" documents that best match the search criteria based on the ranking information. For example, if search criteria includes a particular keyword, documents may be ranked according to how many times each document contains the particular keyword.

Depending on the criteria provided for the search, the set of documents returned from a search may range from being empty to being very large. The quality of the search may be determined by how many relevant documents are identified in the returned set of documents, and may also consider how many non-relevant documents are identified. A higher quality search identifies more relevant documents and fewer non-relevant documents in the set of documents.

In order to determine the quality of a search, documents identified in the search may be retrieved and reviewed to determine whether they are relevant to the litigation hold. The review may be done by one or more members of the legal team associated with the litigation or by other means. Once a document is reviewed, the document may be labeled with an indication of relevance. The label may provide a binary indicator, indicating that a document is either relevant or non-relevant. Alternatively, the label may indicate a degree of relevance to the litigation hold, such as a percentage.

Once all the documents, or a defined subset of documents, in the set of returned documents have been labeled with a relevance indicator, the quality of the search can be determined. Unless it can be shown that all the relevant documents have already been retrieved, the initial search criteria, the quality of the results, and the returned set of documents may be reviewed. New search criteria may then be generated and a new search may be performed. Several iterations of search and review may be required to develop criteria that will result in a high quality search.

As described herein, a training set of documents may be utilized to help generate keywords and queries. A training set of documents may be a subset of a large set of documents subject to a litigation hold. For example, if 100,000 documents exist in a set under litigation hold, a set of 1,000 may be used as a training set. The training set of documents may be determined by a systematic workflow that samples documents based on multiple criteria, such as the top documents relevant to a particular query, the top documents representative of a cluster, a random sample of documents across all documents or within a cluster, or any other set of documents. The training set may be reviewed by a member of a legal team to determine which of the training set documents are relevant to the case and which are not. After reviewing the training set of documents, embodiments described herein may use the data of the training set to suggest keywords and queries to return documents in the larger set that reflect the characteristics of the documents previously reviewed. These documents may also be reviewed or labeled in the same way as the training documents.

The training set of documents may constantly evolve, and suggestions may improve based on the documents in the training set. For example, embodiments may start with a training set of 100 documents with labels indicating whether individual documents are relevant or not. Each subsequent iteration may add another 100 documents to the labeled set. These additional documents may be added to the training set to improve keyword or query suggestions.

In conjunction with labeled documents, a set of predicted labeled documents may also be used to suggest keywords and queries. These documents may be generated in part by building a classifier. A classifier may be built using the currently labeled set of documents. For example, 500 out of 100,000 documents may be currently labeled. The relevance score over the remaining unlabeled set of documents (in this example, 99,500 documents) may be predicted using the classifier. The relevance score may range, for example, between −1 and 1. In this example, a score of −1 indicates that the document is predicted to be highly irrelevant, while a score of 1 indicates that the document is predicted to be highly relevant. The absolute value of the prediction score may indicate how confident the model is in making the prediction. For example, if the score is close to 0 (i.e. 0.1 or −0.075) the classifier is deemed not confident as to whether to label the particular document as relevant or non-relevant. If the score is close to 1 (i.e. 0.85 or −0.93), the classifier has a high confidence in its prediction of relevant and non-relevant documents. Of the unlabeled documents, those documents having a high confidence score may be labeled to be either relevant or not. The confidence score may be compared against a threshold to determine whether the document should be labeled. For example, out of 99,500 unlabeled documents, 25,000 documents may have a confidence score above a threshold (for example, 0.6). Those 25,000 documents may be assigned a predicted label based on the sign of the score (positive for relevant, negative for non-relevant). The total pool of 500 labeled documents and 25,000 predicted labeled documents may be used to suggest keywords and queries.

Search Criteria

Search criteria may include several types of information about the relevant documents. For example, the litigation hold may target documents that were created, modified, or transmitted during one or more specific time periods. In this example, if the time and date information obtained for a particular document does not fall within a specified period, the document would not satisfy the search criteria and would not be included in the results. For a variety of reasons, specified time periods may be modified in subsequent searches. A document falling within the specified time period(s) may be subject to further analysis as described herein.

Another common element of search criteria is the identification of document owners or custodians. For example, emails and other electronic documents belonging to individuals that are involved in the events leading up to the litigation may be relevant to the litigation hold and may be identified as potentially relevant to the search. As new information is obtained about the individuals involved in the related events, a new list of custodians can be generated for an update to the search criteria.

Other search criteria may be used as well. For example, the name or textual content of a document may be compared to a list of keywords that are related to the subject matter of the case. If a keyword is found in the title or contents of the document, the document may be identified as potentially relevant to the litigation. Keywords used as search criteria may not be limited to single words. A keyword may be a string of characters or may include operators, such as wildcard characters that are used in searching character strings, as known to persons of ordinary skill in the relevant art(s). A keyword may also be known as a search term, and may include two or more words. In this way, keywords can be used to find, for example, words, pairs of words, strings of words, phrases, or expressions. Some keywords may be more significant than others in a given search. While some keywords may be only an indication of possible relevance, other keywords may, by themselves, positively identify a document as relevant or non-relevant without the need for further review.

Search criteria may be further defined by using complex queries, such as those used in character string manipulation. Conjunctive and disjunctive boolean operators (AND and OR) may be used together to generate queries having complex expressions of keywords. Similarly, the NOT operator can be used to generate queries that provide greater specificity, as will be explained below.

The above-described search elements may be combined together to develop a complete set of search criteria that is used to search the identified corpus of documents for potentially relevant documents. The search may be performed by one or more processing devices.

Figure 2:
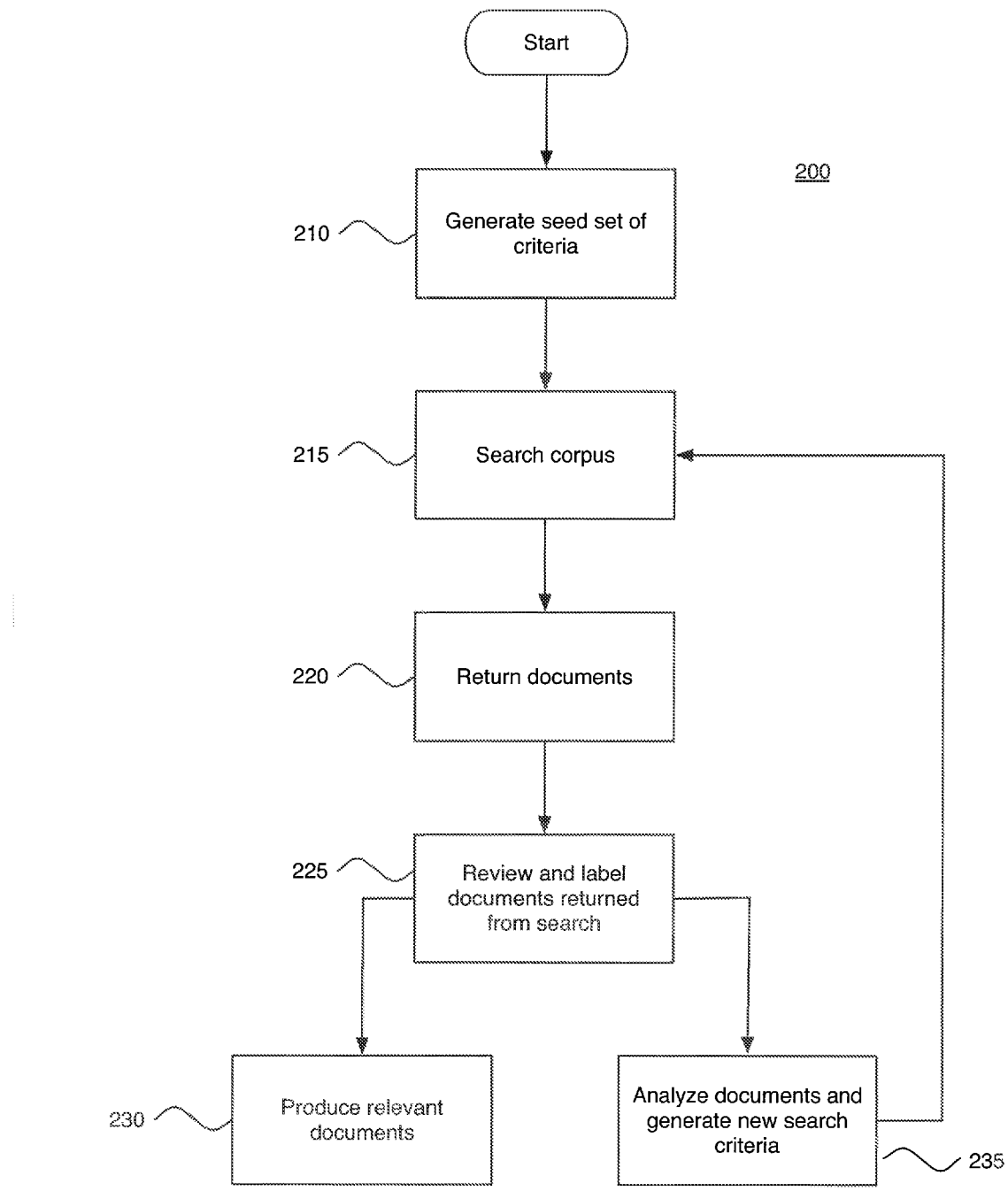
FIG. 2 is a flow diagram of a method for searching for potentially relevant documents, according to an embodiment.

FIG. 2 is a flow diagram of an exemplary method 200 detailing the process described above, according to an embodiment. At block 210, information pertaining to the litigation is examined and an initial set (seed set) of criteria is generated. The seed set may be based on, for example, educated guesses by those knowledgeable in the particular litigation. Initial criteria may include, for example and without limitation, identification of a corpus of documents to search, target time periods, a seed set of custodians, and a seed set of keywords. At block 215, the corpus of documents is searched using the search criteria. At block 220, a set of potentially relevant documents is returned.

At block 225, the documents are reviewed. During this process, the set of potentially relevant documents is reviewed for relevance to the litigation hold, and reviewed documents are labeled with an indication of relevance. Documents that are labeled as relevant at block 225 may be produced, at block 230, for use in the litigation. Also, at block 225, some relevant documents may be removed from the production due to confidentiality, privilege, and other considerations.

Following block 225, the search criteria, the resulting set of documents, and the documents' respective indications of relevance may be analyzed to determine the quality of the search at block 235. If another search is desired, a new set of search criteria may be generated at block 235. Using the new search criteria, the process returns to block 215, at which a subsequent search is performed and a new set of potentially relevant documents is returned. The process then proceeds to block 220, as described above and iterates through blocks 215, 220, 225 and 235 in an effort to improve the quality of the search results.

Improving the quality of the search in a subsequent iteration requires a thorough analysis of the potentially relevant documents and the indications of relevance from a prior search. A challenge for a legal team is to perform the analysis and generate improved search criteria in as little time as possible. Many reviewers may be needed to manually review all the potentially relevant documents in a reasonable amount of time. This process is frequently expensive and time consuming According to an embodiment, new search criteria for a search in a litigation hold can be quickly generated by an automated method. A first set of documents may be returned from an initial search based on a seed set of keywords or queries. In an embodiment, a process and system are provided for generating additional keywords or queries to be used in the search criteria. One or more processing devices may be used to generate keywords or queries based on the results of an initial search. Various analytical techniques may be employed to determine the significance of keywords found in the documents or queries returning relevant documents.

Generating Keywords

As discussed above, a search for documents relevant to litigation may begin with a simple search using one or more keywords (a seed set) that are identified as being related to the subject matter of the litigation. However, relying on the set of documents resulting from a simple search may not be sufficient in certain circumstances. An initial search may be so broad that the resulting set of documents is prohibitively large. Alternatively, the search may be so narrow that it fails to include many relevant documents. Further, the initial set of keywords may not be the best keywords or the keywords most indicative of relevance to the litigation. There may be other keywords relevant to the litigation that were not included in the seed set.

As described above, an iterative process of searching with a set of keywords, evaluating the results returned by that set of keywords, and updating the set of keywords may be used to improve the quality of a search. In order to improve the quality of the searches with each iteration, it is important to determine which elements of the search criteria were most effective. For example, keywords which yield the most relevant documents and the fewest non-relevant documents have a higher "discriminatory power" than keywords yielding more non-relevant documents, fewer relevant documents, or both. In addition, if the relevance indications indicate degrees of relevance rather than simply relevance vs. non-relevance, the discriminatory power may be determined by yielding the documents with the highest degree of relevance.

The discriminatory power of a keyword may be determined either directly or indirectly. In both cases, labeled documents are needed, where each label indicates whether a document is relevant to the case. As detailed above, the labeled documents may be either the actually labeled documents or predicted labeled documents. The discriminatory power of a keyword may be computed directly, for example, as the mutual information of a keyword with respect to the relevance indications. Other criteria similar to mutual information may be used to directly determine the discriminatory power of a keyword.

Alternatively, indirect computation of a keyword's discriminatory power may be done in two steps. In the first step, a classifier such as a linear support vector machine (SVM) classifier may be built using labeled training data. Such a classifier may learn a weight for each keyword in the set of documents. These weights may indicate the discriminatory power of each keyword.

Other methods may be used to identify keywords that may be useful to return further relevant documents in the set of documents under litigation hold. In a set of relevant documents found by a search using a seed set of keywords, one or more of the keywords from that seed set will be present in every document. Keywords from the seed set of keywords may be referred to herein as seed set keywords. Keywords not in the seed set but that exhibit certain characteristics when compared to keywords from the seed set may be referred to herein as relationship based keywords. Such relationship based keywords may be useful in the review process. Relationship based keywords may be determined based on a co-occurrence relationship or a similarity relationship.

For example, a second keyword's co-occurrence context with a seed set keyword may indicate that the second keyword is useful. The co-occurrence context of a second keyword refers to the nature of the spatial proximity of the second keyword as compared to the seed set keyword as measured across the entire corpus. For example, a second keyword may occur within a window of 5 words before or after a seed set keyword, may occur in the same paragraph as a seed set keyword, or may occur in the same document as a seed set keyword. These may be referred to as the window context, paragraph context, and document context, respectively.

In an embodiment, a second set of keywords may be based on the consistency relationship generated from a seed set keyword. For example, once the context definition is determined, the frequency of occurrence of the seed set keyword with all other keywords in that context may be computed across the entire corpus. This measure may be known as the joint co-occurrence between the seed set keyword and another keyword. Using a normalization technique, such as point-wise mutual information, Jaccard coefficient, cosine similarity, or other normalization techniques, the joint co-occurrence frequency may be converted to a consistency measure which quantifies how much more often two keywords co-occur in the predefined context than by random chance. If a keyword occurs with a high consistency with a seed set keyword, then it likely shares the discrimination properties with the seed set keyword and may be suggested as an alternate keyword.

In an embodiment, a second set of keywords based on a similarity relationship may be generated from words related to the seed set of keywords. There are many ways in which a keyword's similarity with other keywords may be generated. For example, a similar set of keywords may be generated based on a second order co-occurrence consistency measure. Second order co-occurrence consistency measures may indicate that two keywords are similar if they co-occur consistently with the same set of keywords. Keywords having a meaning similar to seed set keywords may be synonymic words or phrases from a known knowledge base such as WordNet, a thesaurus, a dictionary, or other sources. Keywords of a similar meaning can also be abbreviations, slang terms, incorrect spellings of keywords or words of a different language. Further, keywords may be known to be synonymous or similar based on knowledge from a particular corpus of documents. For example, certain brand names used by a particular business may be known to be synonymous with generic terms based on the documents used by that particular business. Additionally, a public corpus of documents may be used to determine similar or synonymous words.

Another example of generating new keywords using linguistic analysis is identifying keywords of a similar type or category. New keywords may be generated from words of the same type or category as seed set keywords. A hyponym is a word that may be considered as a type of another word, known as a hypernym. For example, the word "green" is a hyponym of the word "color." In this example, the word "color" is the hypernym. Other hyponyms of "color" are other colors, such as blue, red or yellow. If "green" is in the seed set of keywords, other colors not listed in the seed set may also be useful keywords. Thus, in an embodiment, a new list of keywords may be generated from other hyponyms of the hypernym of one or more keywords in the seed set of keywords.

Relationship based keywords may be identified with the assistance of data mining techniques implemented on a corpus of documents. For example, data mining techniques may be used on an enterprise's collection of documents to determine that a particular product name and an acronym share the same meaning. Additionally, data mining techniques may be used to determine that two words appear together and share a co-occurrence relationship.

Combinations of the above described keyword generation methods may be used for determining a new set of search keywords. For example, a keyword with a high discriminatory power may be identified using a training set of documents. Using this keyword, other keywords having a relationship with that identified keyword may be included in the new set of search keywords.

For example, a particular keyword X may have a high discriminatory power. Additionally, keyword Y may be identified which has a low discriminatory power, but has a high co-occurrence with keyword X. Suggesting keywords using discriminatory power alone may result in Y not being part of the suggested set of keywords. Additionally, the relationship between keyword X and keyword Y would only have been evident if keyword X was identified as having high discriminatory power. Thus, by combining the two methods above, key word Y may be suggested to a user. The fact that the keyword Y was not found to be discriminatory could be attributed to the possibility that the label data (both actual and predicted) may still be incomplete. Suggestion methods as disclosed herein may utilize this partial knowledge to create a more complete knowledge through signals embedded in the corpus, such as the various kinds of relationships between keywords.

Such a combination of the two above-described techniques may be implemented using, for example, a random walk. In a random walk based on probabilities, the first probability may be directly related to the discriminatory power of the keyword. Thus, the second probability may be based on the relationship probability to the discriminatory keyword. Keywords that are generated as a result of the random walk may be suggested to the user.

Figure 3:
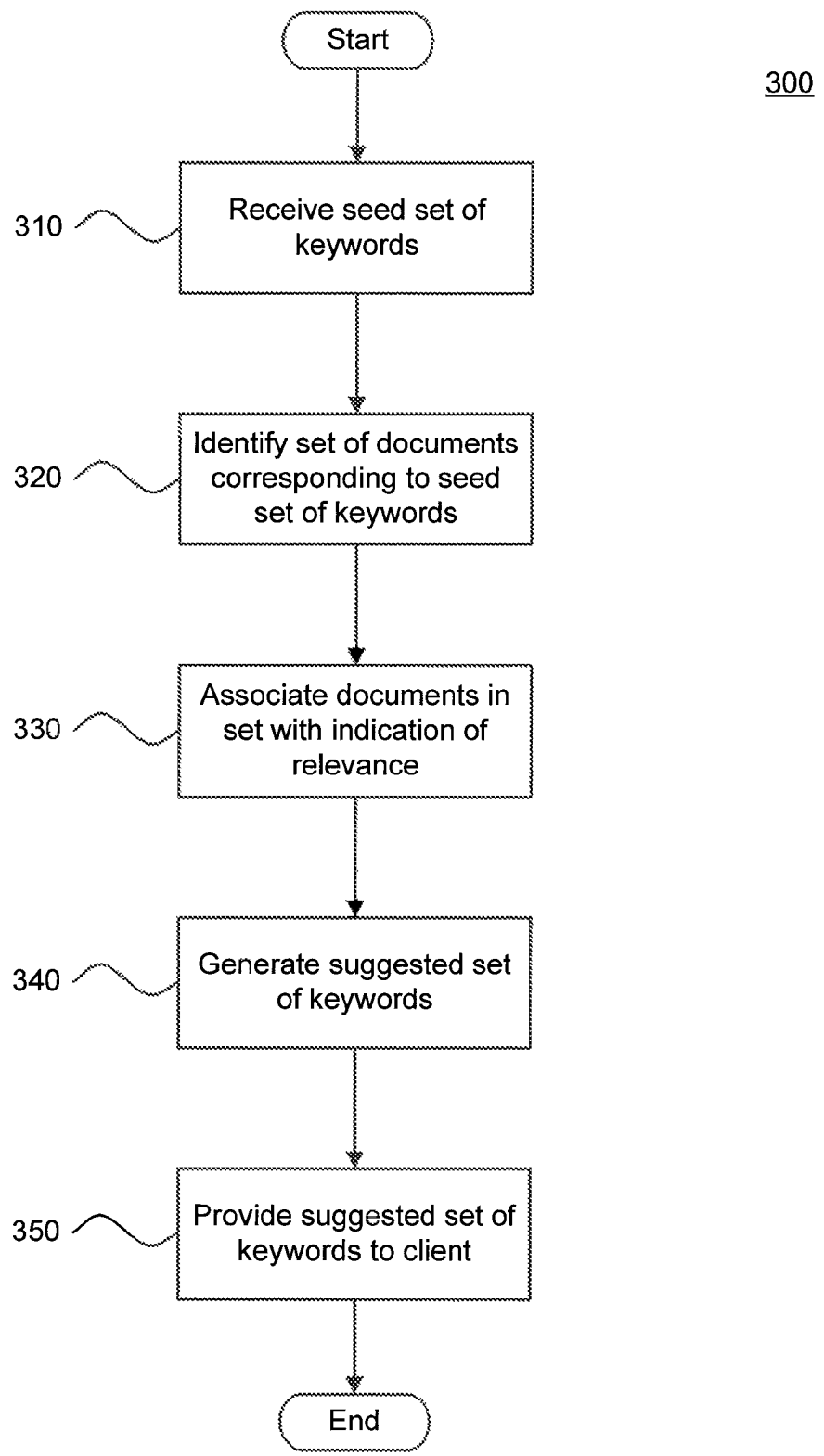
FIG. 3 is a flow diagram of a method of a process for generating new keywords in accordance with an embodiment.

FIG. 3 is a flow diagram of a method 300 of a process for providing a suggested set of keywords, according to an embodiment.

At block 310, a seed set of keywords is received. The seed set may be provided by, for example, a client such as a member of a legal team, based on information pertinent to the current matter.

At block 320, a set of documents corresponding to the seed set is identified. Documents may be identified by searching a specific corpus of documents on a particular device, such as a computer, storage device, or on a hosted user environment.

At block 330, documents in the set identified at block 320 are associated with an indication of relevance. For example, a particular document may be very related to the particular matter, and may receive an indication noting that the document is relevant. As described above, an indication of relevance may be provided as a numerical score. For example, a particular document may receive a score of 95 on a scale of 0-100, indicating that the document is very relevant to the particular matter. Alternatively, documents may simply be given a binary indication of "relevant" or "not relevant".

At block 340, a suggested set of keywords is generated. The suggested set of keywords may be generated by a processing device, such as a computer executing software. The suggested set of keywords may be determined to be discriminatory according to the discriminatory power of the particular keyword. Additionally, the suggested set of keywords may share a relationship with one or more of the first set of keywords. Additionally, each keyword in the suggested set may or may not be a keyword present in the seed set of keywords.

At block 350, the suggested set of keywords is provided to a client.

In an embodiment, a random walk may be utilized to suggest keywords based on both the discriminatory power and relationship between keywords. Thus, at block 340 of method 300, a second set of keywords may be generated that are determined to be discriminatory according to the discriminatory power of the particular keyword. Based on this set of keywords, a suggested set of keywords may be generated based on the relationship between other words and keywords in the second set. The suggested set of keywords may also include keywords related to seed set keywords. For example, a keyword with a high discriminatory power in the second set may be the word "phone". Thus, keywords and terms related to the word "phone", such as "telephone", "cell phone", or "smartphone" may be provided in the suggested set of keywords, based on a random walk.

In an embodiment, generated sets of keywords are based on the documents in the set identified at block 320. A subset of the returned documents may be considered as a training set of documents. As described with respect to block 330, documents in the training set may be associated with an indication of relevance. Using the indications of relevance, words more likely to appear in documents having a high associated relevance score may be identified and suggested to a client in accordance with blocks 340 and 350. Additionally, words more likely to appear in documents having a high associated relevance score may be utilized to find additional keywords using a random walk algorithm. Words more likely to appear in documents having a low associated relevance score may also be identified and suggested to a client as words to be ignored in further searches. The training set of documents used may grow in accordance with embodiments described herein to improve the keyword suggestions.

In an embodiment, a current set of documents corresponds to keywords in the both the seed set and keywords in the generated suggested set. Thus, the suggested set of keywords may be used to identify further relevant documents in the searched corpus. Alternatively, in an embodiment, a current set of documents may not correspond to keywords in both the seed set and keywords in the generated suggested set. This may be, for example, if the keywords in the generated suggested set are indicative of non-responsive or irrelevant documents.

New search keywords may be identified using the seed set of keywords, a set of documents corresponding to the seed set of keywords, and indications of relevance of the set of documents. The keywords found in a set of relevant documents may be useful in separating relevant from non-relevant subject matter. In an embodiment, a new set of keywords may be generated from keywords that are present in the relevant set of documents, but not present in the non-relevant documents. Thus, a set of keywords may be generated based on these characteristics. By excluding keywords from the seed set in the generated set of keywords, the keywords suggested to the client are entirely new to the client.

The keyword suggestion process in accordance with embodiments may be continuously evolving in an iterative fashion. For example, a set of keywords may be generated and suggested as a result of an iteration of method 300 of FIG. 3. Based on this set of keywords, a further set of keywords may be suggested as a result of a further iteration of method 300 of FIG. 3.

Additionally, as a training set of documents grows, method 300 of FIG. 3 may be repeated with a larger training set of documents. As more documents are added, further discriminatory keywords and relationship based keywords may be identified and suggested to a client.

Figure 4:
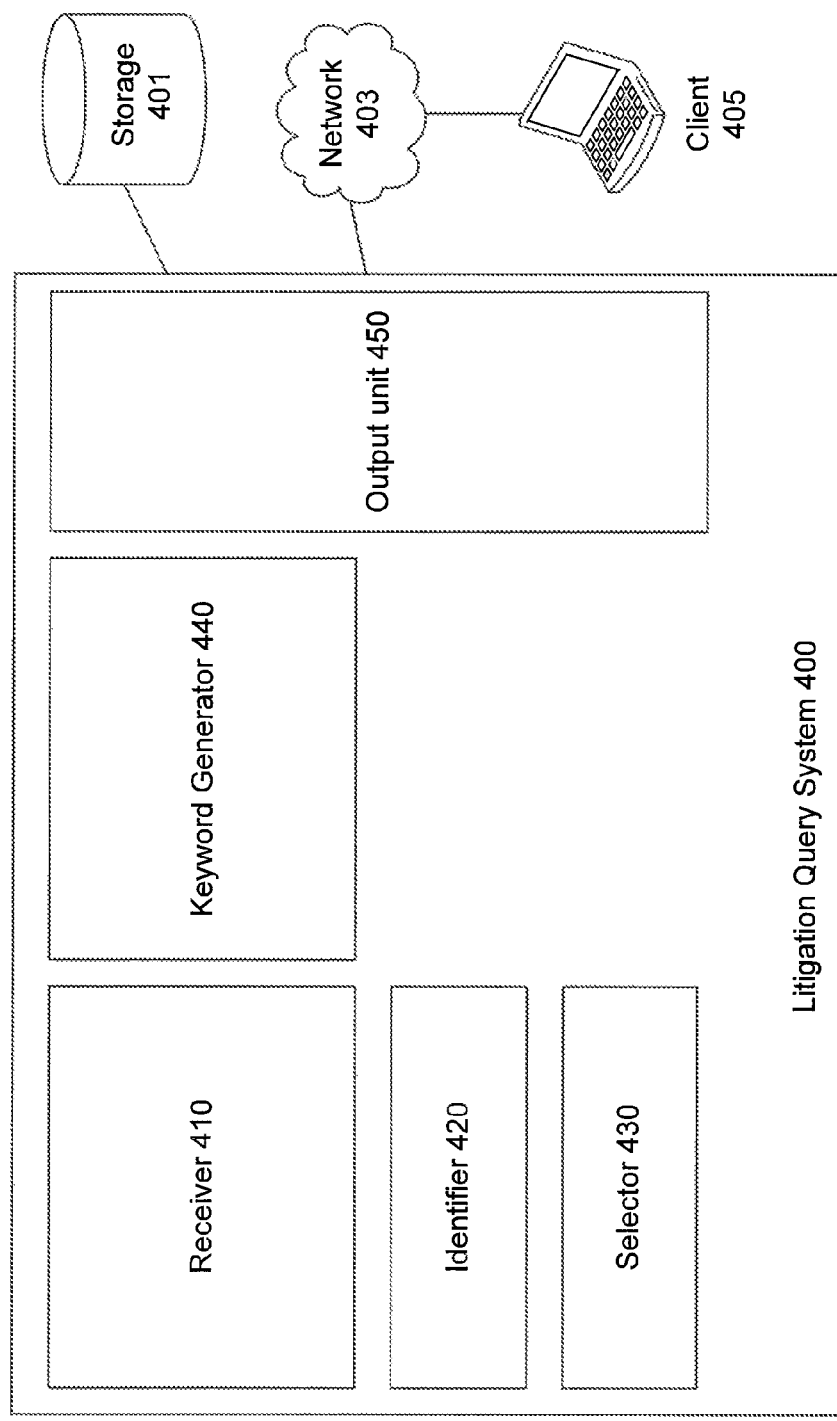
FIG. 4 is a diagram of a system in accordance with an embodiment.

FIG. 4 is a diagram of an exemplary litigation query system 400 that may be used to implement various embodiments disclosed herein.

Litigation query system 400 includes a receiver 410. Receiver 410 may be configured to receive data such as seed keywords or initial queries. Additionally, receiver 410 may be configured to receive data such as a training set of documents, as described with respect to various embodiments disclosed herein.

Litigation query system 400 also includes an identifier 420 and selector 430. Identifier 420 may be used in accordance with various embodiments disclosed herein to identify documents corresponding to a query or keywords. Selector 430 may be configured in accordance with various embodiments disclosed herein to select documents, a query, or a keyword.

Litigation query system 400 may also include keyword generator 440. Keyword generator 440 may operate in accordance with various blocks of method 300 to generate suggested keywords, based on training documents or other data provided by other components of litigation hold system 400.

Litigation query system 400 may also include output unit 450. Output unit 450 may be configured to display or otherwise notify a user, client, or other party of suggested keywords or results generated by keyword generator 440.

In an embodiment, litigation query system 400 is connected to network 403. Network 403 may be a local area network (LAN), wide area network (WAN), intranet, internet, WI-FI, cell phone network, or any other wired or wireless network for communication between computing devices. In an embodiment, litigation query system is connected to client 405 via network 403.

In an embodiment, litigation query system 400 may be connected to storage 401, directly or indirectly via network 403. Storage 401 may contain a training set of documents, a set of documents to be placed on litigation hold, or any other data necessary for the operation of litigation query system 400.

Figure 5:
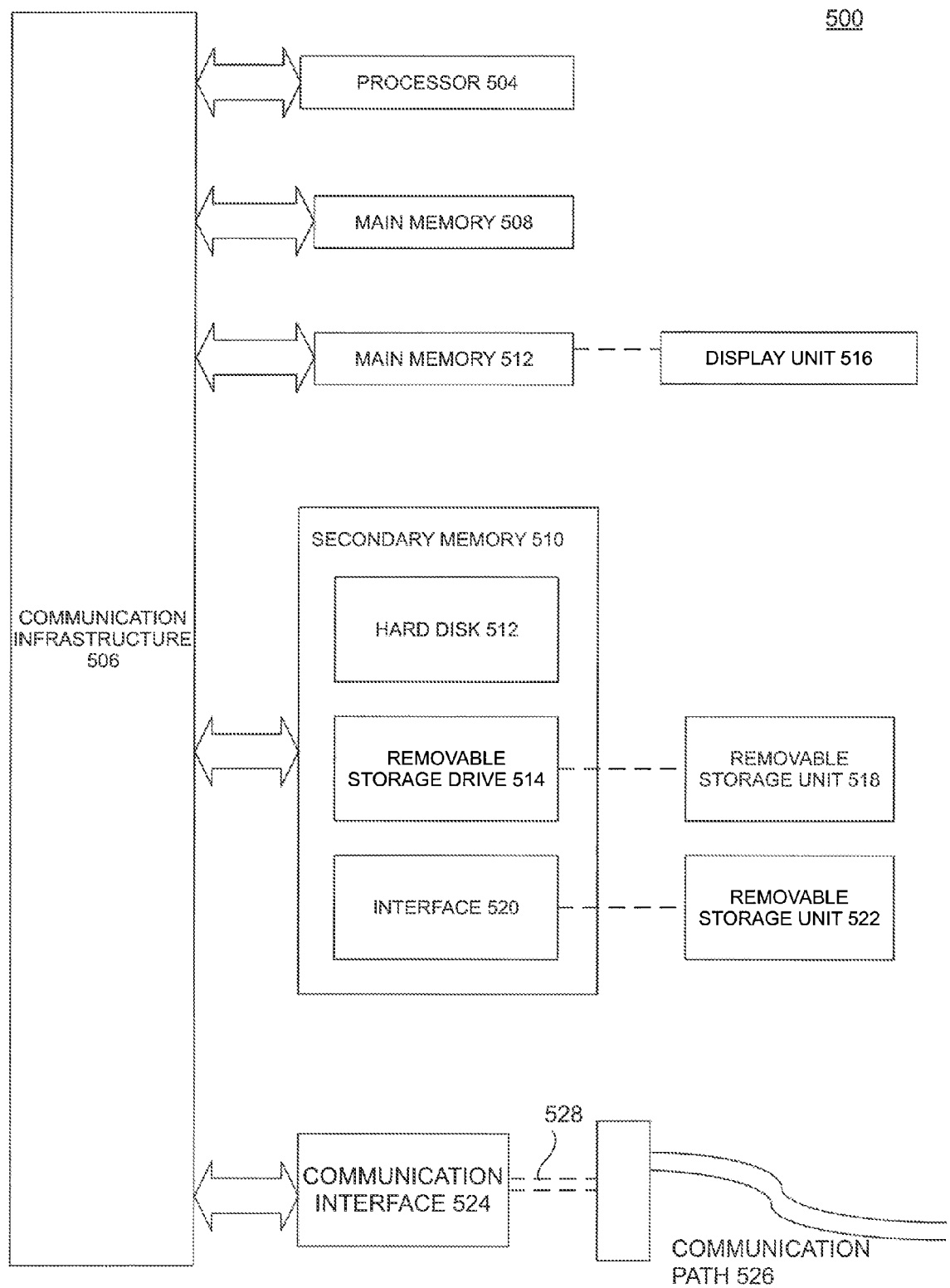
FIG. 5 is a diagram of an exemplary computer system used to implement various embodiments.

Various aspects of embodiments described herein can be implemented by software, firmware, hardware, or a combination thereof. FIG. 5 illustrates an example computer system 500 in which the embodiments, or portions thereof, can be implemented as computer-readable code. Various embodiments are described in terms of this example computer system 500.

Computer system 500 includes one or more processors, such as processor 504. Processor 504 can be a special purpose or a general purpose processor. Processor 504 is connected to a communication infrastructure 506 (for example, a bus or network).

Computer system 500 also includes a main memory 508, such as random access memory (RAM), and may also include a secondary memory 510. Secondary memory 510 may include, for example, a hard disk drive and/or a removable storage drive. Removable storage drive 514 may include a floppy disk drive, a magnetic tape drive, an optical disk drive, a flash memory, or the like. The removable storage drive 514 reads from and/or writes to removable storage unit 518 in a well known manner Removable storage unit 518 may include a floppy disk, magnetic tape, optical disk, etc. which is read by and written to by removable storage drive 514. As will be appreciated by persons skilled in the relevant art(s), removable storage unit 518 includes a computer readable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 5800 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals which may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program product" and "computer readable medium" are used to generally refer to storage media such as removable storage unit 518, removable storage unit 522, and a hard disk installed in hard disk drive 512. Computer program product and computer readable medium can also refer to one or more memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the embodiments as discussed herein. In particular, the computer programs, when executed, enable processor 504 to implement the processes of embodiments, such as the steps in the methods discussed above. Accordingly, such computer programs represent controllers of the computer system 500. Where embodiments are implemented using software, the software may be stored in a computer program product and loaded into computer system 500 using removable storage drive 514, interface 520, or hard drive 512.

Embodiments may also be directed to computer products having software stored on any computer readable medium. Such software, when executed in one or more data processing devices, causes a data processing device(s) to operate as described herein.

Conclusion

Embodiments may be implemented in hardware, software, firmware, or a combination thereof. Embodiments may be implemented via a set of programs running in parallel on multiple machines.

The summary and abstract sections may set forth one or more but not all exemplary embodiments of the present invention as contemplated by the inventor(s), and thus, are not intended to limit the present invention and the appended claims in any way.

Embodiments of the present invention have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments.

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A method of suggesting keywords for a litigation hold, comprising:
   receiving a seed set of keywords;
   identifying, by one or more processing devices, a set of documents corresponding to the seed set of keywords;
   determining an indication of relevance for each document in a subset of the set of documents, wherein the subset comprises a plurality of documents, and wherein the indication of relevance for each document comprises a specified percentage degree of relevance of the document to the seed set of keywords;
   computing a discriminatory power of the keywords based on the indication of relevance for each document, wherein the discriminatory power of each keyword is determined based on how many relevant and non-relevant documents are yielded based on the respective keyword;
   generating, by one or more processing devices, a suggested set of keywords with a highest computed discriminatory power, wherein each keyword in the suggested set of keywords occurs within a same portion of a particular one of the plurality of documents that is textually subdivided into two or more portions; and
   providing the suggested set of keywords to a client, wherein the suggested set is used to perform a further search of the set of documents.

2. The method of claim 1, wherein each keyword in the suggested set of keywords identifies a document as a relevant document.

3. The method of claim 1, wherein the indication of relevance includes a value in a range of positive and negative values, and wherein an absolute value of the indication of relevance comprises a confidence score indicating a confidence level associated with the determined indication of relevance of each respective document.

4. The method of claim 3, further comprising:
   labeling the document with the indication of relevance if the confidence score exceeds a threshold confidence level.

5. The method of claim 4, wherein the indication of relevance is a binary indicator, indicating whether or not the document is relevant.

6. The method of claim 1, wherein the computing comprises:
   directly computing the discriminatory power based on the indications of relevance for each document.

7. The method of claim 1, wherein the computing comprises:
   indirectly computing the discriminatory power based on a set of training documents, wherein each training document includes an indication of relevance that is determined prior to the determining the an indication of relevance for each document in a subset of the set of documents.

8. The method of claim 1, wherein each keyword in the suggested set of keywords occur in a same paragraph of a particular one of the plurality of documents.

9. A method of suggesting keywords for a litigation hold, comprising:
   receiving a seed set of keywords;
   identifying, by one or more processing devices, a set of documents corresponding to the seed set of keywords;
   determining an indication of relevance for each document in a subset of the set of documents, wherein the subset comprises a plurality of documents, and wherein the indication of relevance for each document comprises a specified percentage degree of relevance of the document to the seed set of keywords;
   computing a discriminatory power of the keywords based on the indication of relevance for each document, wherein the discriminatory power of each keyword is determined based on how many relevant and non-relevant documents are yielded based on the respective keyword;
   generating, by one or more processing devices, a suggested set of keywords with a highest computed discriminatory power, wherein each keyword in the suggested set of keywords occurs within a same portion of a particular one of the plurality of documents that is textually subdivided into two or more portions; and
   providing the suggested set of keywords to a client, wherein the suggested set is used to perform a further search of the set of documents.

10. The method of claim 9, wherein each keyword in the suggested set of keywords is linguistically related to one or more keyword in the seed set of keywords.

11. The method of claim 10, wherein each keyword in the suggested set of keywords has a meaning similar to one or more keyword in the seed set of keywords.

12. The method of claim 11, wherein each keyword in the suggested set of keywords is a synonym, an incorrect spelling, or an abbreviation of one or more keyword in the seed set of keywords.

13. The method of claim 10, wherein each keyword in the suggested set of keywords is a hyponym of a hypernym of one or more of the keywords in the seed set of keywords.

14. The method of claim 9, further comprising:
   receiving relationship information, wherein the keyword in the suggested set of keywords is related to one or more keywords in the seed set of keywords based on the relationship information.

15. A system for suggesting keywords for a litigation hold, comprising:
- a first receiver, implemented on a computing device including at least one processor, configured to receive a seed set of keywords;
- an identifier, implemented on the computing device, configured to identify a set of documents corresponding to the seed set of keywords;
- a keyword generator, implemented on the computing device, configured to:
  - determine an indication of relevance for each document in a subset of the set of documents, wherein the subset comprises a plurality of documents, wherein the indication of relevance for each document comprises a specified percentage degree of relevance of the document to the seed set of keywords,
  - compute a discriminatory power of the keywords based on the indication of relevance for each document, wherein the discriminatory power of each keyword is determined based on how many relevant and non-relevant documents are yielded based on the respective keyword, and
  - generate a suggested set of keywords with a highest computed discriminatory power, wherein each keyword in the suggested set of keywords occurs within a same portion of a particular one of the plurality of documents that is textually subdivided into two or more portions; and
- an output unit, implemented on the one or more processing devices, configured to provide the suggested set of keywords to a client, wherein the suggested set is used to perform a further search of the set of documents.

16. The system of claim 15, wherein each keyword in the suggested set of keywords occurs in a same proximity in the set of documents as one or more keywords in the seed set of keywords.

17. The system of claim 16, wherein the same proximity is a same paragraph in a same document in the set of documents.

18. A system for suggesting keywords for a litigation hold, comprising:
- a first receiver, implemented on a computing device including at least one processor, configured to receive a seed set of keywords;
- an identifier, implemented on the computing device, configured to identify a set of documents corresponding to the seed set of keywords;
- a generator, implemented on the computing device, configured to:
  - determine an indication of relevance for each document in a subset of the set of documents, wherein the subset comprises a plurality of documents, wherein the indication of relevance for each document comprises a specified percentage degree of relevance of the document to the seed set of keywords,
  - compute a discriminatory power of the keywords based on the indication of relevance for each document, wherein the discriminatory power of each keyword is determined based on how many relevant and non-relevant documents are yielded based on the respective keyword, and
  - generate a suggested set of keywords with a highest computed discriminatory power, wherein each keyword in the suggested set of keywords occurs within a same portion of a particular one of the plurality of documents that is textually subdivided into two or more portions, wherein each keyword in the suggested set of keywords is external to the seed set of keywords, and wherein each keyword in the suggested set of keywords occurs more frequently in documents in the subset determined to be relevant than documents in the subset determined to be not relevant; and
- an output unit, implemented on the computing device, configured to provide the suggested set of keywords to a client, wherein the suggested set is used to perform a further search of the set of documents.

19. The system of claim 18, wherein each keyword in the suggested set of keywords has a meaning similar to one or more keyword in the seed set of keywords.

20. The system of claim 19, wherein each keyword in the suggested set of keywords is a hyponym of a hypernym of one or more of the keywords in the seed set of keywords.

21. The system of claim 18, further comprising:
- a third receiver, implemented on the computing device, configured to receive relationship information, wherein the keyword in the suggested set of keywords is related to one or more keywords in the seed set of keywords based on the relationship information.

22. A non-transitory computer readable medium containing instructions which, when executed by one or more processing devices, perform a method of suggesting keywords for a litigation hold, the method comprising:
- receiving a seed set of keywords;
- identifying, by the one or more processing devices, a set of documents corresponding to the seed set of keywords;
- determining an indication of relevance for each document in a subset of the set of documents, wherein the subset comprises a plurality of documents, wherein the indication of relevance for each document comprises a specified percentage degree of relevance of the document to the seed set of keywords;
- computing a discriminatory power of the keywords based on the indication of relevance for each document, wherein the discriminatory power of each keyword is determined based on how many relevant and non-relevant documents are yielded based on the respective keyword;
- generating, by one or more processing devices, a suggested set of keywords with a highest computed discriminatory power, wherein each keyword in the suggested set of keywords occurs within a same portion of a particular one of the plurality of documents that is textually subdivided into two or more portions; and
- providing the suggested set of keywords to a client, wherein the suggested set is used to perform a further search of the set of documents.

23. A non-transitory computer readable medium containing instructions which, when executed by one or more processing devices, perform a method of suggesting keywords for a litigation hold, the method comprising:
- receiving a seed set of keywords;
- identifying, by one or more processing devices, a set of documents corresponding to the seed set of keywords;
- determining indication of relevance for each document in a subset of the set of documents, wherein the subset comprises a plurality of documents, wherein the indication of relevance for each document comprises a specified percentage degree of relevance of the document to the seed set of keywords;
- computing a discriminatory power of the keywords based on the indication of relevance for each document, wherein the discriminatory power of each keyword is determined based on how many relevant and non-relevant documents are yielded based on the respective keyword;

generating, by one or more processing devices, a suggested set of keywords with a highest computed discriminatory power, wherein each keyword in the suggested set of keywords occurs within a same portion of a particular one of the plurality of documents that is textually subdivided into two or more portions, wherein each keyword in the suggested set of keywords is external to the seed set of keywords, and wherein each keyword in the suggested set of keywords occurs more frequently in documents in the subset determined to be relevant than documents in the subset determined to be not relevant; and providing the suggested set of keywords to a client, wherein the suggested set is used to perform a further search of the set of documents.

24. A method of suggesting keywords for a litigation hold, comprising:

receiving a seed set of keywords;

identifying, by one or more processing devices, a set of documents corresponding to the seed set of keywords;

determining indication of relevance for each document in a subset of the set of documents, wherein the subset comprises a plurality of documents, wherein the indication of relevance for each document comprises a specified percentage degree of relevance of the document to the seed set of keywords;

computing a discriminatory power of the keywords based on the indication of relevance for each document, wherein the discriminatory power of each keyword is determined based on how many relevant and non-relevant documents are yielded based on the respective keyword;

generating, by one or more processing devices, a suggested set of keywords with a highest computed discriminatory power, wherein each keyword in the suggested set of keywords occurs within a same portion of a particular one of the plurality of documents that is textually subdivided into two or more portions, wherein each keyword in the suggested set of keywords is external to the seed set of keywords, and wherein each keyword in the suggested set of keywords occurs more frequently in documents in the subset determined to be relevant than documents in the subset determined to be not relevant;

generating, by one or more processing devices, a suggested set of keywords, wherein each keyword in the suggested set of keywords is determined to be related to one or more keywords in the second set of keywords or seed set of keywords; and providing the suggested set of keywords to a client, wherein the suggested set is used to perform a further search of the set of documents.

25. The method of claim 24, wherein the suggested set of keywords is generated based on a random walk algorithm.

* * * * *